Sept. 27, 1966 W. J. MATTOX 3,275,571
CRYSTALLINE ZEOLITE COMPOSITION AND METHOD
OF PREPARATION THEREOF
Filed Sept. 11, 1962
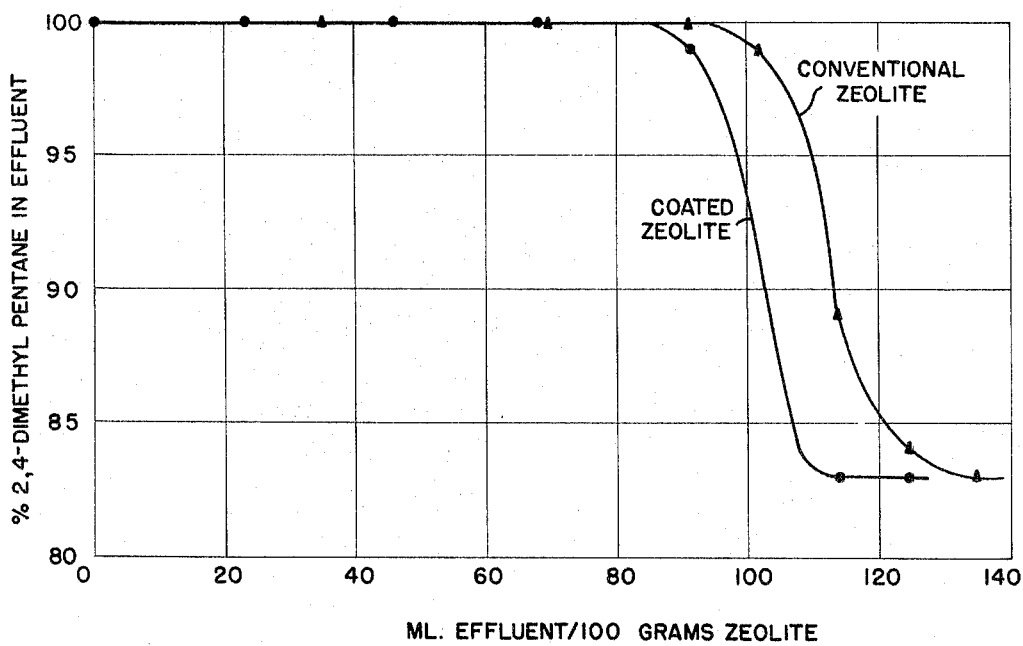
William Judson Mattox  Inventor
By Robert J. Pearlman
Patent Attorney 3,275,571
CRYSTALLINE ZEOLITE COMPOSITION AND
METHOD OF PREPARATION THEREOF
William Judson Mattox, Baton Rouge, La., assignor to
Esso Research and Engineering Company, a corporation
of Delaware
Filed Sept. 11, 1962, Ser. No. 222,923
14 Claims. (Cl. 252—451)

The present invention is concerned with means for obtaining an improved crystalline alumino-silicate zeolite material, and the zeolite thereby produced. More particularly, it deals with the preparation of coated crystalline alumino-silicate zeolites by the addition of silica to the reaction mixture in which said crystalline alumino-silicate zeolites have been formed.

Crystalline metallic alumino-silicate zeolites, often loosely termed "molecular sieves" are well-known in the art. They are characterized by their highly ordered crystalline structures and have pores of nearly uniform dimensions in the general range of about 4 to 15 Angstroms. These crystalline zeolites have an alumino-silicate anionic cage structure in which the alumina and silica tetrahedra are intimately connected to each other. Metal cations or hydrogen are distributed through the structure to maintain electrical neutrality. The highly ordered dispersion of the alumina and silica tetrahedra makes for a large number of active sites and the uniform pore openings of the zeolites allow for easy ingress of certain molecular structures.

Thus, zeolites having average pore diameters of 4 to 5 Angstroms will adsorb normal paraffin hydrocarbons while excluding branched hydrocarbons. Large pore sieves, i.e. effective pore diameters of 6 to 15 Angstroms, have an adsorptive affinity for olefins, cyclic and aromatic constituents, etc. Moreover these large pore zeolites have recently been found to have catalytic effect in various conversion processes, as is described in U.S. Patents 2,971,903 and 2,971,904. These zeolites occur naturally. However, they have found considerable acceptance in the market place due to their substantially increased availability from synthetic sources. A naturally occurring example of a large pore zeolite is the mineral faujasite. Synthetically produced alumino-silicate zeolites having large effective pore diameters have been termed in the industry as Type 13, i.e."13X" and "13Y," molecular sieves. Another large pore zeolite, synthetic mordenite, and the hydrogen form of mordenite, which have an effective pore diameter of about 10 Angstroms have recently become available (see Chem. and Engineering News, March 12, 1962).

In general, the chemical formula of the anhydrous crystalline alumino-silicate zeolites, expressed in terms of mols may be represented as $$0.9 \pm 0.2 Me_{2/n}O : Al_2O_3 : XSiO_2$$

wherein Me is selected from the group consisting of metal cations and hydrogen, $n$ is its valence, and X is a number from 1 to 14, preferably 2 to 12. The large pore zeolites have an X value generally in the range of 2.5 to 12, whereas the 4 to 5 Angstrom zeolites have small ratios of silica to alumina. The zeolite as produced or found in nature is normally an alkali metal such as sodium or an alkaline earth metal such as calcium.

The processes for producing such zeolites synthetically are now well known in the art. The crystalline zeolites are prepared by having present in the reaction mixture: $Al_2O_3$ as sodium aluminate, alumina sol and the like: $SiO_2$ as sodium silicate and/or silica gel and/or silica sol; and alkaline hydroxide, e.g. sodium hydroxide, either free or in combination with the above components. Careful control is kept over the soda concentration of the mixture, as well as the proportions of silica to alumina and soda (metal oxide) to silica, the crystallization period, etc., all in a manner known per se. A general scheme for preparing large pore crystalline alumino-silicate zeolites would be as follows:

Colloidal silica, such as commercial Ludox, is mixed with a solution of sodium hydroxide and sodium aluminate at ambient temperatures. The reaction mixture may be allowed to digest at ambient temperatures for periods of up to 40 hours or more, e.g. 24 hours. The reaction mixture is then heated to 180° to 250° F., preferably 200° to 220° F., for a period of 24 to 200 hours or more, preferably 50 to 100 hours, in order to effect crystallization. The crystalline, metallic alumino-silicate is then separated from the aqueous mother liquor by decantation and washed and thus recovered as a crystalline product having a particle size of about 0.05 to 5 microns.

The following table sets forth a summary of the molar ratios of reactants normally employed in the synthesis of such crystalline alumino-silicate zeolites.

TABLE I

| Reactants (Mole Ratio) | General Range | Preferred Range for 4 to 5A. | Preferred Range for 13X | Preferred Range for 13Y |
|---|---|---|---|---|
| $Na_2O/SiO_2$ in Reaction Mixture | 0.6–2 | 0.7–1.5 | 0.7–1.5 | 0.2–0.8, especially 0.28–0.45. |
| $SiO_2/Al_2O_3$ in Reaction Mixture | 1–40 | 1.5–2.5 | 2.5–5 | 8–30, especially 10–30. |
| $SiO_2/Al_2O_3$ in Crystalline Zeolite Product. | 1–14 | 1–2.2 | 2–3 | 4–6, especially 5–6. |

One of the problems encountered in using such crystalline alumino-silicate zeolites in many commercial operations, etc. moving or fluidized bed, adsorption or hydrocarbon conversion processes, has been the difficulty of handling the extremely fine size zeolite crystals. In this form they are too small to be employed successfully in such operations in that they cannot be fluidized because of their size. Difficulty has also been encountered in using these small particle size zeolites in slurry-type contacting due to subsequent settling and other related difficulties in the product recovery stages.

In accordance with the present invention, means are taught for forming a unique coated crystalline alumino-silicate zeolite wherein the zeolite crystals are bound by a coating containing a major portion of silica along with some sodium silicate. This is accomplished by a process wherein normal waste materials are employed in forming said coating and wherein a minimal number of process steps are employed.

More particularly, in accordance with the present invention after the formation of crystalline alumino-silicate zeolites which precipitate from the reaction mixture, thus leaving a mother liquor solution containing various amounts of reactants, an aqueous sol of colloidal silica is added so as to form an admixture of zeolite crystals, silica sol and mother liquor. The solution is preferably subjected to mixing such as by agitation and is maintained at a reaction temperature of about 50° to 200° F., preferably 70° to 125° F. for periods of as little as 5 minutes or less and generally falling in the range of 0.25 to 1 hour or less. The crystals are thus imbedded in, or coated with, a matrix consisting predominantly of silica but additionally containing sodium silicate, normally as well as some alumina. In general sufficient colloidal silica is added so that the final dried, coated crystalline alumino-silicate product will contain 5 to 90, preferably 10 to 60 wt. percent metallo-alumino-silicate zeolite, the remainder being coated material. Normally, there is thus added an aqueous sol of 2 to 60, preferably 5 to 50 wt. percent colloidal silica, the weight ratio of aqueous silica sol to mother liquor and zeolite crystals falling in the range of 0.1 to 200, preferably about 1 to 150. The resulting coating or matrix formed about the crystalline zeolites will contain about 60 to 98, preferably 70 to 95 wt. percent silica; 1 to 20, preferably 2 to 10 wt. percent metal silicate (sodium or other metal); and 1 to 30, preferably 1 to 15 wt. percent alumina (on a dry basis based on total weight of coating or matrix).

After the colloidal silica has been allowed to react with the mother liquor and zeolite crystals, normally at a pH above about 9, e.g. 9 to 12 (that characterizing the conventional zeolite crystallization admixture), the coated zeolite may be subjected to a wide variety of steps. Normally it is subjected to at least one washing step, preferably a water wash, in order to remove excess reagents, such as sodium hydroxide, etc. It may thereafter be dried and used directly, preferably after an additional calcining treatment at temperatures in excess of 500° F., e.g. 500° to 1500° F. Alternatively, it may be spray dried in a conventional manner, crushed, and/or subjected to sizing, extrusion or pelleting.

In those applications wherein the crystalline alumino-silicate zeolite is to be employed as a catalyst, it is highly desirable to subject the coated zeolite crystals to exchange with a metal cation or hydrogen-containing cation so as to reduce the soda content ($Na_2O$) to less than 10 wt. percent and preferably from about 2 to 6 wt. percent (based on zeolite crystals). The metal cation can be any metal of Groups I to VIII and the rare earth metals but preferably is a member of the group consisting of Group II, III, IV, V, VI–B, VII–B, VIII and rare earth metals. Examples thereof are the following: calcium, magnesium, aluminum, antimony, barium, cadmium; rare earth metals such as cerium, praseodymium, lanthanum, neodymium and samarium; chromium, cobalt, copper, iron, lead, lithium, manganese, nickel, silver, strontium, zinc, tin, platinum, palladium, molybdenum, vanadium, rhodium, and zirconium. The hydrogen containing cation is preferably a hydrogen ion or an ammonium ion.

To form such materials the coated crystalline alumino-silicate zeolite is exchanged with suitable salt solutions of the above metals or the hydrogen-containing cations at a temperature normally of 60° to 150° F. via conventional ion exchange techniques. In general, at least two-thirds of the soda which may originally have been present in the zeolite is exchanged with the catalytic metal or hydrogen cation so that the resulting exchanged, coated crystalline alumino-silicate zeolites contain at least 1 to 2 wt. percent, preferably 3 to 20 wt. percent, of these metals as the catalytic agent. The base exchange may be readily effected by contacting the coated crystalline alumino-silicate zeolite with a suitable salt solution, e.g. magnesium sulfate, calcium chloride, barium chloride, iron sulfate, etc., or alternatively, a hydrogen containing cation, e.g. ammonium hydroxide, ammonium chloride, etc. After base exchange, the resulting composition is then normally washed free of soluble ions and subjected to drying at temperatures of 225° F. to 700° F. for periods of 1 to 12 hours. It may thereafter be calcined at temperatures of 500° to 1500° F., preferably at 750° to 1000° F. for 1 to 2 hours. Calcination may be conducted in the presence of steam.

Catalytic materials similar to that described in U.S. 2,971,904 may be readily made from the above base exchanged, coated zeolites by thereafter impregnating with a suitable metal. For example, platinum group metals such as palladium, platinum, and rhodium or other metals such as molybdenum, chromium, vanadium, cobalt, nickel, copper, silver and manganese may be deposited on the coated, base exchanged zeolite to give a catalytic material characterized by a coated alumino-silicate zeolite in which a substantial portion of the alkali metal has been replaced and which contains elemental metal deposited thereon.

The present process for coating or imbedding crystalline alumino-silicate zeolites in a siliceous coating offers numerous advantages over the prior art procedures. Whereas the prior art processes treat completely recovered zeolite crystals with siliceous gel in a step distinct from the formation of the sieve crystals, the present process eliminates the various intermediate steps, e.g. washing and drying of the zeolite crystals and reslurrying, encountered in such an operated. Most importantly, waste materials present in the mother liquor, i.e. alumina, sodium silicate, and silica are used to precipitate the colloidal silica sol so as to form a hydrogel which encompasses and coats the zeolite crystals. Thus, the present matrix of coating contains a variety of materials, i.e. silicate as well as silica, and is formed by the use of a smaller quantity of added silica than characterizes the prior art processes.

It has been found that the present coated zeolites after base exchange have excellent catalytic conversion properties and can be used in such processes as catalytic cracking, hydrocracking, hydrogenation, oxidation, and oxonation. Moreover, the coated crystalline zeolite as such has demonstrated better adsorptive characteristics than conventional crystalline alumino-silicate zeolites. In operations employing zeolites for either adsorptive or catalytic processes or both, the present compositions which normally average in particle size from about 10 to 250 microns are readily suitable for use as fluidizable adsorbents or catalysts as well as being suitable for moving bed and other process operations. At the same time these coated zeolites provide a more attrition resistant material.

By way of clarifying nomenclature, the term "coated crystalline alumino-silicate zeolites" is used to denote the present composition wherein the crystalline alumino-silicate particles are suspended in and distributed throughout a matrix of siliceous material. Thus, although the zeolite is partially or entirely enclosed or embedded in the siliceous material there is still provided sufficient means for access of molecules to and from the zeolite pore openings so as to provide known attributes of crystalline alumino-silicate materials.

The various aspects and modifications of the present invention will be made more clearly apparent by reference to the following examples and accompanying drawing.

*Example 1*

The present example illustrates the process and zeolite product of the present invention, as well as the base exchange thereof.

A solution of 300 gram of NaOH and 85 grams of sodium aluminate in 1075 cc. of water was added with stirring to 1930 grams of low soda Ludox contained in a two-gallon porcelain crock. Ludox is a commercial name for an aqueous sol of colloidal silica containing 30 wt. percent $SiO_2$ and manufactured by E. I. du Pont de Nemours and Co., Inc. Stirring was continued until the mixture was homogenous and then heated to 210° to 215° F. for 5½ days to effect crystallization. The aqeuous layer was decanted and a small portion of the crystalline sieve removed for analysis. The sieve sample after washing until the wash water had a pH of 9.5 and drying, analyzed 14.0 wt. percent $Na_2O$, 64.6% $SiO_2$ and 21.4% $Al_2O_3$. On a mol basis this corresponds to: 1.08

$Na_2O:1.00\ Al_2O_3:5.12\ SiO_2$. This zeolite has a large pore structure, which has been termed the "13Y" structure.

The remainder of the unwashed sieve was slurried in the separated supernatant (mother) liquor in approximately the same proportion as existed during crystallization (50 grams per liter) and the slurry then mixed with vigorous stirring with an equal volume of low soda Ludox which contained 30% $SiO_2$ in aqeuous suspension. The pH of the solution was about 11 and the temperature 80° F. The gel which formed immediately was separated from excess water and soluble components and oven dried at 150° F. for 4 hours, crushed to suitable size, i.e. through 20 mesh, and washed to remove the remaining soluble compounds.

The composite was then exchanged three times with 17% $MgSO_4$ solution at 80° F., washed free of sulfate ion and dried at 275° F. for 6 hours and then at 850° F. for 16 hours for evaluation as a cracking catalyst. The final product had the following composition: 21 wt. percent zeolite (5.8 wt. percent of which was MgO and 5.5 wt. percent $Na_2O$), 79 wt. percent coating (90.7 wt. percent of which was silica, 2.2 wt. percent sodium silicate and 3.3 wt. percent alumina, probably present as an amorphous alumina-silicate).

*Example 2*

The magnesium alumino-silicate-silica composite prepared in Example 1 was evaluated as a cracking catalyst in comparison with standard amorphous silica-alumina (3–A) cracking catalyst by cracking cetane at 950° F. and atmospheric pressure in ten-minute cycles.

Significant data are shown in the following table. The silica-alumina (3–A) catalyst was amorphous, contained 25 wt. percent alumina, 75 wt. percent silica and had a surface area of 473 sq. meters per gram and a pore volume of 0.70 cc. per gram after heating 3 hours at 1000° F. The zeolite catalyst was calcined at 850° F. for 16 hours prior to use.

TABLE II

[Cetane cracking tests atmospheric pressure; 10 min. cracking cycle]

| | Catalyst | |
|---|---|---|
| | 21% Mg-Y 79% Amorphous Siliceous Coating | 25% $Al_2O_3$ 3A Cracking Cat. |
| Test No | 18-A | 14-A |
| Temperature, °F | 953 | 973 |
| W./hr./w.: | | |
| For Total Composite | 3.6 | 3.5 |
| For Catalytic Components | 17.1 | 3.5 |
| Conversion, Wt. Percent | 75.7 | 49.8 |
| Liquid Product: | | |
| Percent of Feed | 33.4 | 63.3 |
| Composition, Percent: | | |
| $C_5$ | 6.6 | 12.3 |
| $C_6$ | 5.9 | 3.5 |
| $C_7$ | 3.2 | 0.6 |
| $C_8$-$C_{15}$ | 11.7 | 4.4 |
| Cetane | 72.6 | 79.2 |
| Gas, ml./g. Feed | 200 | 160 |

The above data show the coated zeolite catalyst was highly active for cracking and under the above test conditions it converted 75.7% of the cetane feed to low boiling product at a feed rate of 17 w./hr./w. (on Mg-Y catalyst). This conversion represents a much higher cracking activity than that of standard 25% alumina 3–A catalyst which gave only 49.8% conversion at a lower feed rate of 3.5 w./h./w. and a temperature 20° higher.

*Example 3*

A portion of the catalyst of fluidizable size range as produced in Example 1, i.e. 44 to 149 microns, was subjected to a laboratory attrition test to obtain a measure of physical stability. The test was made on dried but uncalcined catalyst, and shows an attrition rate comparable to that of fresh, uncalcined amorphous silica-alumina catalyst of Example 2.

| Catalyst: | Attrition rate, percent/hr. |
|---|---|
| Coated zeolite | 10.1 |
| Amorphous silica-alumina | 9.6 |

Calcining the fresh silica-alumina catalyst improved the attrition rate to 3 to 4% per hour and similar improvements can be anticipated with calcined, coated zeolite, as shown subsequently in Example 8.

*Example 4*

Sodium alumino-silicate of the large pore diameter type was prepared as in Example 1, suspended at a temperature of 85° F. in the super natant crystallization liquor (104 g. sieve/2 liters), and added with stirring to an aqueous sol of colloidal silica (2420 g.) which contained 30% $SiO_2$. The pH of the blend was 11.2. The gel was washed to remove most of the soluble components, oven dried at 250° F. for 4 hours, and crushed to pass 10 mesh. The screened material was then water washed until the wash water had a pH of 7.7. The washed catalyst was rescreened and a 10–30 mesh portion, i.e. 590 to 2000 microns, separated for fixed-bed adsorption tests described in the following example.

*Example 5*

The 10-30 mesh portion of the sodium alumino-silicate-silica preparation from Example 4 contained 11 wt. percent sieve by analysis (the remainder being coating). This material was dried by calcining at 850° F. for 16 hours and was then charged to a vapor-jacketed, fixed-bed adsorption column for the following selective adsorption test.

A hydrocarbon mixture containing 18 vol. percent benzene (B.P. 176° F.) and 82% 2,4-dimethylpentane (B.P. 177° F.) was vaporized and passed at a feed rate of 0.72 w./w./hr. (based on zeolite) into the bed of coated zeolite maintained at a temperature of 240° F. Samples of the condensed effluent were collected at frequent intervals for analysis. When the composition of the effluent approached that of the feed, fresh feed was discontinued and the column flushed with nitrogen. The adsorbed benzene was recovered from the adsorbent by steam displacement at the same temperature. The following results were obtained.

TABLE III

[Separation of 2,4-dimethylpentane and benzene with Na-13Y coated Zeolite Adsorbent]

| Sample | Ml./100 g. Zeolite | Composition | |
|---|---|---|---|
| | | Percent 2,4-DMP | Percent Benzene |
| Effluent: | | | |
| 1 | 22.7 | 100 | 0 |
| 2 | 22.8 | 100 | 0 |
| 3 | 22.7 | 100 | 0 |
| 4 | 22.7 | 99 | 1 |
| 5 | 22.8 | 83 | 17 |
| 6 | 11.3 | 83 | 17 |
| Total | 125.0 | | |
| Zeolite Desorbate | 19.3 | 0 | 100 |

These data are also shown graphically in FIGURE 1 and are discussed following Example 6 in relation to a similar adsorption made with uncoated zeolite crystals.

*Example 6*

A selective adsorption test was carried out in the same equipment and under the same conditions as in Example 5 using the conventional non-coated zeolite made suitable for fixed-bed operation by mechanical compression and crushing to 10–30 mesh. The sized material was dried at 850° F. for 16 hours and then used in the following adsorption test. The zeolite had been prepared by the basic technique of Example 1, but the crystals were directly recovered from the mother liquor, and had not been subjected to the addition of colloidal silica.

TABLE IV

[Separation of 2,4-dimethylpentane and benzene with conventional Na-13Y Zeolite]

| Sample | Ml./100 g. Zeolite | Composition | |
|---|---|---|---|
| | | Percent 2,4-DMP | Percent Benzene |
| Effluent: | | | |
| 1 | 11.4 | 100 | 0 |
| 3 | 23.5 | 100 | 0 |
| 6 | 33.4 | 100 | 0 |
| 8 | 22.7 | 100 | 0 |
| 9 | 11.4 | 99 | 1 |
| 10 | 11.3 | 89 | 11 |
| 11 | 11.1 | 84 | 16 |
| 12 | 10.5 | 83 | 17 |
| Total | 135.3 | | |
| Zeolite Desorbate | 21.6 | 0 | 100 |

These data are shown graphically in FIGURE 1 for comparison with the data from Example 5 obtained with coated zeolite. The following tabulation of data shows the volumes of pure paraffins (2,4-DMP) and volumes of intermediate composition (requiring recycle) as read from the correlations of FIGURE 1 and the volumes of pure benzene as shown in the tabulated data for Examples 5 and 6. These recoveries are also shown as percentages of the total of the three types of recovered product.

TABLE V

| Zeolite | Pure 2,4-DMP | Intermediate Composition (For Recycle) | Pure Benzene | Total |
|---|---|---|---|---|
| Coated (SiO$_2$): | | | | |
| Ml./100 g. Zeolite | 86 | 26 | 19.3 | 131 |
| Percent of Total Products | 65.5 | 19.8 | 14.7 | 100.0 |
| Uncoated: | | | | |
| Ml./100 g. Zeolite | 92 | 42 | 21.6 | 155.6 |
| Percent of Total Products | 59.1 | 27.0 | 13.9 | 100.0 |

As observed from FIGURE 1 and from the above tabulated comparison, the coated zeolite gave a sharper break in effluent composition after saturation of the adsorbent with benzene so that: (1) a higher percentage (65.5 vs. 59.1) of products is recovered as pure paraffin with the coated sieve, (2) a lower percentage of material of intermediate composition, which would require recycle, is obtained with the coated sieve (19.8 vs. 27.0), and (3) these advantages are obtained without significant loss in adsorptive capacity for aromatics.

*Example 7*

The composition of the coated zeolite prepared in Example 1 was determined by chemical analysis. By subtracting the components comprising the 21% of zeolite, the following composition of the coating material was obtained:

| | Wt. percent |
|---|---|
| Silica | 86.9 |
| Sodium silicate | 2.2 |
| Magnesium silicate | 6.3 |
| Alumina | 3.3 |
| Magnesia | 1.3 |

The alumina and magnesia are probably present as an amorphous magnesium alumino-silicate.

*Example 8*

A portion of the coated alumino-silicate prepared in Example 4 and having a particle size range of 44 to 149 microns (100–325 mesh) was calcined at 1000° F. for 16 hours and then subjected to a laboratory attrition test as in Example 3 to obtain physical stability data. The attrition rate as determined in this test was 4.6 percent per hour which is equivalent to calcined, fresh, commercial amorphous silica-alumina cracking catalyst.

The process of this invention and the coated zeolite products produced thereby are subject to many useful variations. For example, the alkaline mother liquor from the zeolite crystallization or its mixture with silica sol may be modified by addition of more alkali, sodium aluminate, silicates, etc. or various other supplemental reagents to effect changes in binder composition and/or modify the adsorptive or catalytic properties of the coated zeolite product. Various available dispersing agents may also be added to promote and maintain the separation and suspension of the individual, extremely fine zeolite particles until the gel has formed.

In a further modification, the suspension of zeolite in a mother liquor-silica sol mixture may be sprayed or otherwise added to a column of oil or other immiscible medium to form droplets which gel and form rigid spherical particles which after washing, ion exchange, calcining, etc., are suitable for use in fluid, fixed, or moving-bed operations depending upon the size droplets introduced into the gelling medium or the size to which they may subsequently be ground.

Having described the present invention, that which is sought to be protected is set forth in the following claims.

What is claimed is:

1. In a process for forming a crystalline alumino-silicate zeolite imbedded in a siliceous matrix, said crystalline alumino-silicate zeolite having been prepared by the interaction of compounds capable of providing alumina, silica, and metal oxides, whereby crystalline alumino-silicate zeolite crystals are allowed to crystallize out of mother liquor solution, the improvement which comprises adding a solution of colloidal silica to an admixture of mother liquor and alumino-silicate zeolite crystals under conditions sufficient to form a gel, the amount of said colloidal silica being sufficient to produce a final product comprising 5 to 90 wt. percent of said crystalline alumino-silicate zeolite imbedded in a silica gel matrix, and thereafter recovering said product.

2. The improvement of claim 1 wherein said colloidal silica is admixed with said mother liquor at a temperature in the range of 50° to 200° F. for a period of 5 to 60 minutes.

3. The improvement of claim 1 wherein said metal oxide is sodium oxide and said product is washed and dried.

4. The improvement of claim 1 wherein said product is subjected to washing and thereafter base exchanging with a metal chosen from the group consisting of the metals of Groups II, III, IV, V, VI–B, VII–B, VIII and rare earth metals.

5. The improvement of claim 1 wherein said product is subjected to washing and then base exchanging with a hydrogen-containing cation.

6. An improved process for preparing fluidizable crystalline alumino-silicate zeolites which comprises forming said crystalline zeolite by admixture of compounds capable of providing alumina, silica and sodium oxide under conditions forming a crystalline alumino-silicate zeolite which precipitates from the mother liquor solution, thereafter adding an aqueous sol of colloidal silica to the mother liquor slurry of said zeolite at conditions sufficient to cause said sol to gel, the amount of said colloidal silica being sufficient to produce a final product comprising 5 to 90 wt. percent of said zeolite in a silica gel matrix, and thereafter recovering said product.

7. The improvement of claim 6 wherein said silica sol, mother liquor, zeolite crystals are maintained at a temperature of 50° to 200° F., and said product is subjected to a water wash.

8. The improvement of claim 6 wherein said product is subjected to base exchange with a metal selected from the groups comprising Groups II, III, IV, V, VI–B, VII–B, VIII and rare earth metals.

9. The improvement of claim 6 wherein said product is subjected to base exchange with a hydrogen-containing cation.

10. In the process for preparing crystalline, metallic alumino-silicate zeolites wherein an admixture of sodium aluminate, silica and sodium hydroxide are reacted in proportions and conditions producing crystalline alumino-silicate zeolites as a result of heating said reaction mixture to a temperature in the range of 180° to 250° F. for a period of 24 to 200 hours in order to effect crystallization, thus forming alumino-silicate zeolite crystals and mother liquor, the improvement which comprises adding an aqueous solution of silica sol, subjecting said admixture of silica sol, zeolite crystals and mother liquor to mixing conditions at a temperature within the range of 50° to 200° F. sufficient to cause said silica sol to gel, the amount of said silica sol being sufficient to produce a product comprising 5 to 90 wt. percent of said zeolite crystals imbedded in a silica gel matrix and thereafter separating said product and subjecting it to a water wash.

11. The improvement of claim 10 wherein said product is subjected to base exchange with a member of the group consisting of the metals of Groups I, II, III, IV, V, VI–B, VII–B, and VIII, rare earth metals, and hydrogen-containing cations.

12. An improved composition of matter containing 5 to 90 wt. percent of a crystalline alumino-silicate zeolite imbedded in 10 to 95 wt. percent of a matrix comprising 60 to 98 wt. percent silica, 1 to 20 wt. percent sodium silicate, and 1 to 30 wt. percent alumina.

13. The composition of claim 12 which contains as a cation in the zeolite internal structure less than 10 wt. percent alkali metal calculated as alkali metal oxide.

14. An improved composition of matter containing 5 to 90 wt. percent of a crystalline alumino-silicate zeolite imbedded in 10 to 95 wt. percent of a matrix (based on total composition), said materix containing 60 to 98 wt. percent silica, 1 to 20 wt. percent sodium silicate, 1 to 30 wt. percent alumina and minor amounts of amorphous alumino-silicate.

References Cited by the Examiner
UNITED STATES PATENTS

| | | | |
|---|---|---|---|
| 2,865,867 | 12/1958 | Van Dyke et al. | 252—455 |
| 2,962,435 | 11/1960 | Fleck et al. | 208—119 |
| 2,971,903 | 2/1961 | Kimberlin et al. | 208—119 |
| 3,006,153 | 10/1961 | Cook. | |
| 3,039,953 | 6/1962 | Eng. | |
| 3,055,841 | 9/1962 | Gladrow et al. | 252—455 |

OSCAR R. VERTIZ, *Primary Examiner.*

MAURICE BRINDISI, *Examiner.*

E. J. MEROS, *Assistant Examiner.*